Figure 7:
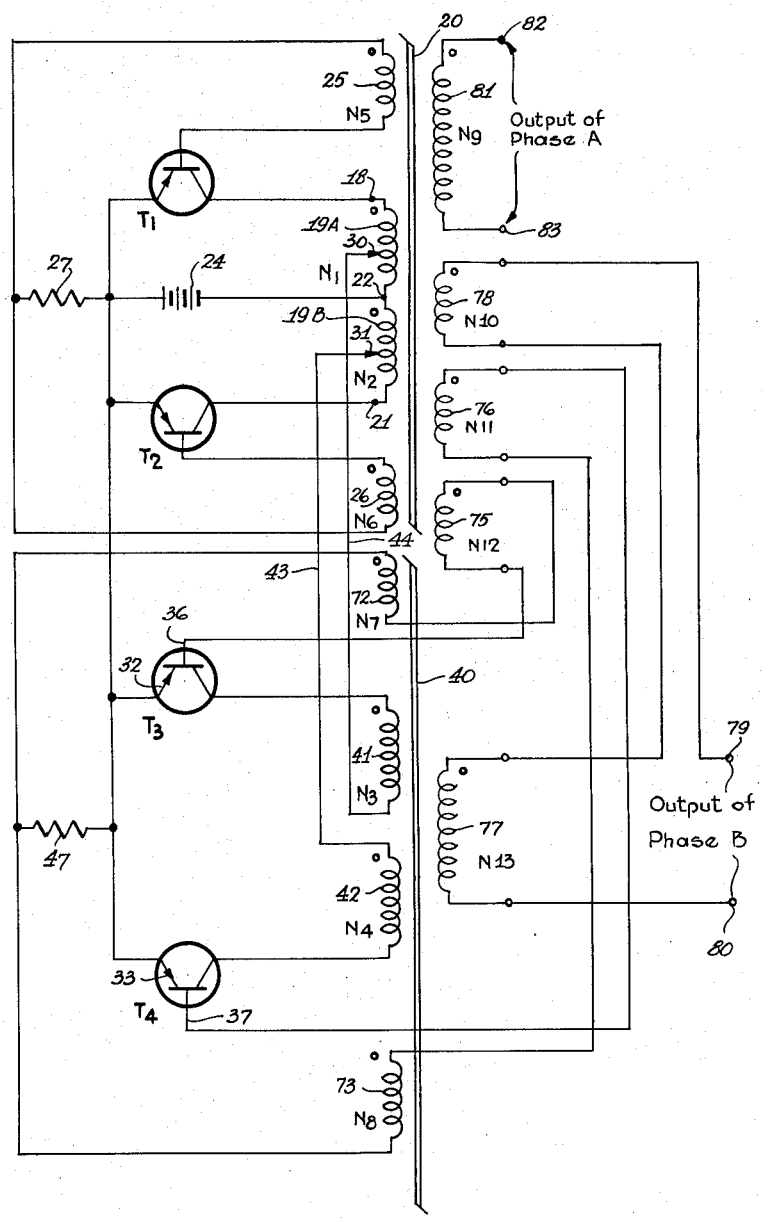

March 20, 1962 J. A. BENNETT ETAL 3,026,484
SELF-LOCKING POLYPHASE MAGNETIC INVERTER
Filed Sept. 19, 1960 3 Sheets-Sheet 1
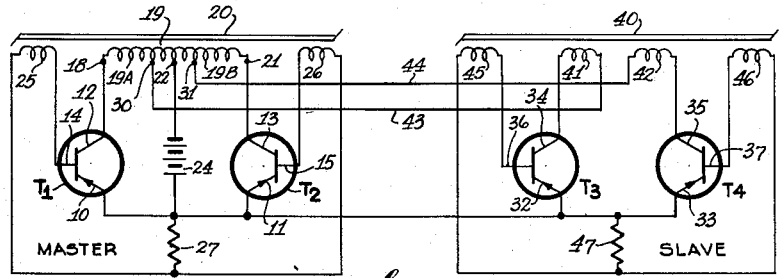
Fig. 1.
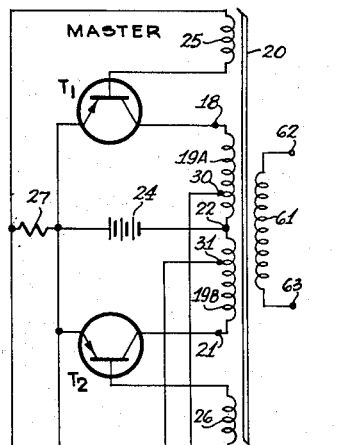
Fig. 6.
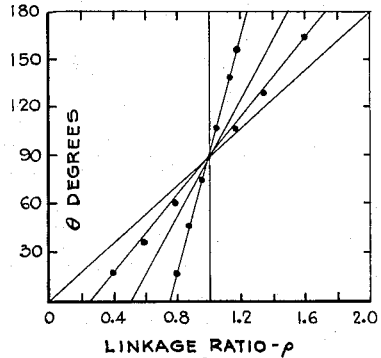
Fig. 4.
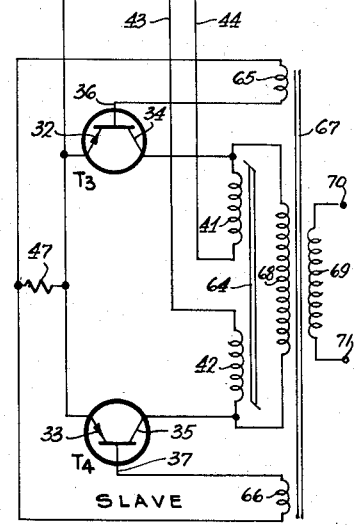
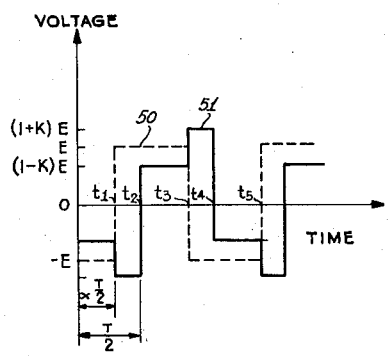
Fig. 2.
INVENTOR
James A. Bennett
Charles H. K. Campling
BY Harold C. Weir
ATTORNEY

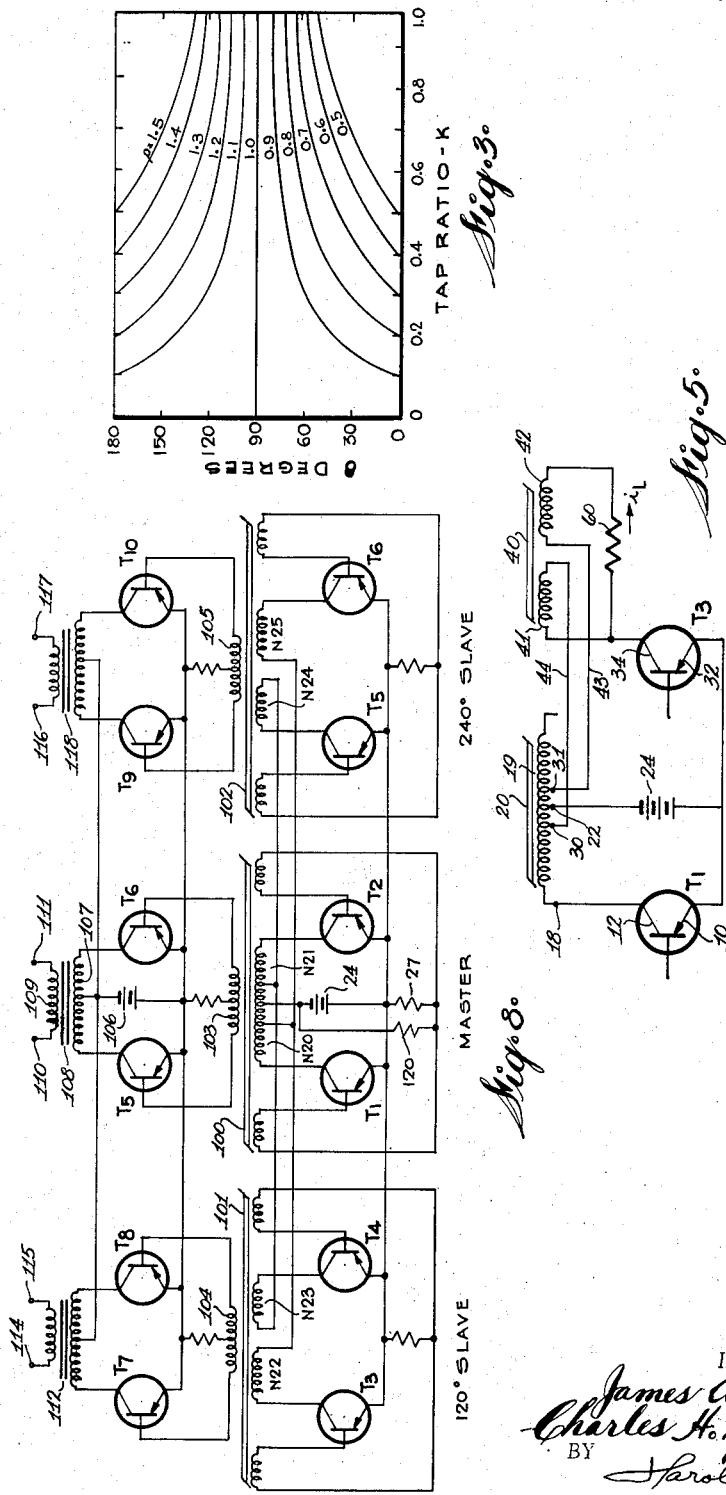

United States Patent Office

3,026,484
Patented Mar. 20, 1962

3,026,484
SELF-LOCKING POLYPHASE MAGNETIC INVERTER
James A. Bennett, 2 Park St., and Charles H. R. Campling, 28 Kensington Ave., both of Kingston, Ontario, Canada
Filed Sept. 19, 1960, Ser. No. 56,769
13 Claims. (Cl. 331—107)

This invention relates to magnetic inverters, and in particular it relates to a self-locking type of magnetic inverter.

Magnetic inverters are well known in the art and are used to provide a convenient source of alternating current from a direct current supply. It is frequently desirable to have one or more of these inverters synchronized or locked to a master inverter. Several arrangements are known for phase-locking a slave inverter to a master inverter of the magnetic type. It is the intention herein that a "magnetic type" of inverter is one which uses magnetic circuitry in combination with a switching device to produce or generate an alternating output when supplied with power from a unidirectional source. Many kinds of switching devices can be used in combination with magnetic circuitry in an invetrer. For example, transistors can be used conveniently as the switching elements, or more generally, any type of semiconductor device that can perform a switching function can be used. Electron tubes may also be used, and in some specific instances, mechanical relays might be used in a magnetic inverter. In the following description reference will be made to "transistor-magnetic inverters" as this is a well known type or class of inverter. Such reference is not intended to exclude magnetic inverters using switching elements other than transistors, but is used for convenience. It is intended that the term "transistor-magnetic inverter" include magnetic inverters using any semiconductive switching devices, tubes and relays where applicable.

One prior art means of phase-locking a slave transistor-magnetic inverter to a master transistor-magnetic inverter provides auxiliary windings on the saturable core used in each of the inverters and connects these in a circuit with an auxiliary timing inductive impedance. This arrangement requires components in addition to those used in the two inverters which increases the cost, and the phase displacement between the two inverters depends directly on the design of the additional or auxiliary components which makes the overall designing of the inverters more difficult.

Another prior art arrangement for phase locking a slave to a master inverter eliminates the need for the supplementary inductive impedance of the previously mentioned prior art arrangement. Because no auxiliary elements are required for locking purposes in this type of inverter arrangement, this type has been termed in this description as "self-locking." This prior art apparatus, however, suffers from the disadvantage that it is limited to having the slave inverter always locked in phase-quadrature with the master inverter. In both the prior art inverter arrangements identical inverters are used for both master and slave. In one of these arrangements the main winding of the slave inverter is split into two sections whereas the main winding in the master inverter is provided with a centertap. However, the number of turns in similar windings of the slave and master inverters are the same and the saturable cores of the slave and master are the same.

The present invention overcomes the limitations of the prior art by providing a self-locking magnetic inverter arrangement which can have any desired phase difference between the master and the slave inverter.

It is therefore an object of my invention to provide an arrangement of a master and a phase-locked slave magnetic inverter in which any desired phase difference between the master and the slave can be obtained.

It is another object of my invention to provide a polyphase power supply using magnetic inverters whereby the various phases available at the output of the power supply may have any desired phase relationship.

Further objects and advantages of my invention will appear from the following description taken in conjunction with the drawings in which:

FIGURE 1 is a schematic diagram showing the basic circuitry used in one embodiment of the invention, FIGURE 2 is a graph of voltage versus time showing steady state waveforms of the circuit of FIGURE 1, FIGURES 3 and 4 are graphs useful in explaining the invention, FIGURE 5 is a partial schematic diagram useful in explaining the operation of the invention, and FIGURES 6, 7 and 8 are schematic diagram of other embodiments of the invention.

In FIGURE 1 a basic circuit that is known in the art is shown. The upper portion of the FIGURE 1 circuit represents a master transistor-magnetic inverter and the lower portion represents a slave transistor-magnetic inverter. In both portions of the circuit the transistors are shown connected in a common emitter configuration. It will, of course, be obvious that other transistor connections would also operate satisfactorily.

FIGURE 1 shows, in the master portion, transistors $T_1$ and $T_2$ having emitter electrodes 10 and 11, collector electrodes 12 and 13, and base electrodes 14 and 15, respectively. The collector electrodes 12 is connected to an end terminal 18 of a main winding 19 on a saturable core 20. Similarly the collector electrode 13 is connected to the other end terminal 21 of winding 19. A centertap 22 divides the main winding into two portions 19A and 19B which have $N_1$ and $N_2$ turns in them, respectively. In the usual or commonly used designs $N_1 = N_2$, that is the winding is symmetrical. The centertap 22 is connected to the negative terminal of a unidirectional power source 24 such as, for example, a battery, the positive terminal of which is connected to emitter electrodes 10 and 11.

The base electrode 14 is connected to one end of an auxiliary or feedback winding 25, and the base electrode 15 is connected to one end of an auxiliary or feedback winding 26. The other ends of windings 25 and 26 are returned through a common resistance 27 to the positive terminal of supply 24.

The portion of the FIGURE 1 circuit just described is a transistor-magnetic inverter which will oscillate at a frequency $$f = \frac{E}{4N_1 \phi} \qquad (1)$$

where E is the voltage of supply 24, and $\phi$ is the saturation flux of the core 20. The windings on the core 20 must, of course, be properly poled for satisfactory operation.

In order that a slave inverter may be synchronized with the master inverter, terminals 30 and 31 are provided on the winding 19. The taps or terminals 30 and 31 are normally equidistant from centertap 22 and the position of the taps can be defined in terms of a tap ratio K. That is, $$K = \frac{\text{number of turns from centertap 22 to tap 30}}{N_1}$$

(2)

Referring now to the slave portion of FIGURE 1, transistors $T_2$ and $T_4$ are shown as having emitter electrodes 32 and 33, collector electrodes 34 and 35, and base electrodes 36 and 37, respectively. The main winding has two separate sections 41 and 42 wound on a saturable core 40. The windings 41 and 42 have $N_3$ and $N_4$ turns, respectively, and in most practical cases the windings are symmetrical and $N_3=N_4$. One end of winding section 41 is connected to terminal 30 through conductor 43, and the other end of winding section 41 is connected to collector electrodes 34. Similarly one end of winding section 42 is connected to terminal 31 by conductor 44, and the other end is connected to collector electrode 35. The emitter electrodes 32 and 33 are both connected to the positive terminal of supply 24. Auxiliary or feedback windings 45 and 46 are similar to windings 25 and 26. The base electrode 36 is connected to one end of auxiliary winding 45, and the base electrode 37 is connected to one end of auxiliary winding 46. The other ends of windings 45 and 46 are connected through a common resistance 47 to the positive terminal of supply 24.

It is apparent that the slave transistor-magnetic inverter is similar in circuitry and design to the master inverter. Indeed the prior art stresses that the two inverters should be similar and designed to operate at the same frequency.

The operation of transistor-magnetic inverters, and of the basic circuit of FIGURE 1 is known and need not be described in detail. The steady state waveforms associated with the operation of the FIGURE 1 circuit can be seen in FIGURE 2. The waveform designated 50 and shown by dashed lines represents the voltage impressed across the winding portion 19A, and the waveform designated by 51 and shown as a solid line represents the voltage impressed across winding section 41. Very briefly the operation of one cycle as depicted in FIGURE 2 can be considered from time $t_1$. At time $t_1$ the transistor $T_1$ switches on and conducts for the period $t_1$ to $t_3$. At time $t_2$ the transistor $T_3$ of the slave switches on the voltage across winding 41 is equal to $E(1-K)$. At time $t_3$ the transistor $T_1$ cuts off and $T_2$ begins to conduct. Thus, in the interval $t_3$ to $t_4$ the voltage on winding 41 is $E(1+K)$. At time $t_4$ the core 40 has reached saturation and the slave inverter switches, that is, $T_3$ switches off and $T_4$ switches on. The cycle is complete at $t_5$ when the master inverter again switches and $T_1$ begins to conduct once more. The phase displacement is designated as $$\frac{\alpha T}{2}$$

where $T$ is the period and $\alpha$ is a numeric measure of displacement. In the prior art design the phase displacement must be 90° as will be shown later.

A discussion of the present invention is simplified by using a term called the linkage ratio $\rho$ which is defined as the ratio of the maximum flux-linkages of the two cores 20 and 40. This is the ratio of the flux linkages produced by saturation flux linking all the turns of the main windings $N_1$ and $N_2$, and the main windings $N_3$ and $N_4$. When $N_1=N_2$ and $N_3=N_4$, the linkage ratio may be defined by the equation $$\rho=\frac{N_3\phi_{40}}{N_1\phi_{20}} \quad (3)$$

where $\phi_{40}$ is the saturation flux in core 40 and $\phi_{20}$ is the saturation flux in core 20.

The linkage ratio is also equal to the ratio of the maximum volt-time areas characteristic of the main windings of the slave and master inverters as given by the equation $$\rho=\frac{\lambda_{40}}{\lambda_{20}} \quad (4)$$

where $\lambda_{40}$ is the volt-time area characteristic of the windings 41 and 42, and $\lambda_{20}$ is the volt-time area characteristic of the winding 19.

It was found that the phase displacement between a master and a slave transistor-magnetic inverter is a function of the linkage ratio and the tap ratio K, see Equations 2, 3 and 4, and that by a suitable selection of these parameters within certain defined ranges any desired phase displacement can be achieved.

While the following explanation is believed to give an accurate account of the theory behind the invention, it is not intended that the theory be considered in a limiting sense.

Referring to the graph of FIGURE 2 and using the numeric $\alpha$ to measure phase displacement which, in the general case may be any displacement, the volt-time area absorbed by the master core 20 in one half cycle would be $$\lambda_{20}=\frac{ET}{2} \quad (5)$$

where $T$ is the period of the master inverter. Siimlarly for the slave core 40

$$\lambda_{40}=\frac{E(1-K)(1-\alpha)T}{2}+\frac{\alpha E(1+K)T}{2} \quad (6)$$

from Equations 4, 5 and 6

$$\rho=\frac{\lambda_{40}}{\lambda_{20}}=(1-K)(1-\alpha)+(1+K)\alpha \quad (7)$$

When Equation 7 is rearranged to give the phase displacement $\alpha$ it becomes $$\alpha=\frac{1}{2}\left(1+\frac{\rho-1}{K}\right) \quad (8)$$

The phase displacement $\theta$ in electrical degrees would be $$\theta=180\alpha=90\left[1+\frac{(\rho-1)}{K}\right] \text{ degrees} \quad (9)$$

It will be noted that the phase displacement is a function of the linkage ratio $\rho$ and the tap ratio K. This was not apparent from the prior art which required that the cores in the master and slave be similar and that $$N_1=N_2=N_3=N_4$$

In such a case $\rho=1$ from Equation 3 it is to be noted that for the case where $\rho=1$ the tap ratio K has no effect on the phase displacement whatsoever. Equation 9 shows that the displacement in the prior art self-locking master-slave inverters must be 90 degrees.

The effect upon phase displacement of varying the tap ratio K and the linkage ratio $\rho$ is shown in FIGURES 3 and 4. FIGURE 3 shows phase displacement in degrees as the tap ratio K varies, with the linkage ratio $\rho$, taken as a parameter. FIGURE 4 shows the effect or phase displacement in degrees as the linkage ratio $\rho$ varies, with the tap ratio K taken as a parameter. Graphs of the type shown in FIGURES 3 and 4 may be used as a guide when designing self-locking inverters.

The regions shown in FIGURES 3 and 4 above $\theta=180$ degrees and below $\theta=0$ degrees are regions of instability. Locking will not occur within these regions.

It is assumed that the tap ratio K cannot approach too closely to zero and can approach, equal and exceed unity only with modifications to the base drive circuit of the slave inverter. Theoretically, by extending the main winding portions 19A and 19B of the master inverter, values of K greater than unity could be obtained. However, values of K approaching unity produce excessive step heights in the winding-voltage waveforms of the slave inverter. It will be noted that the feedback voltage applied to the bases of the slave transistors approaches zero as the value of K approaches unity. In other words this base driving voltage during the lower portion of the waveform of FIGURE 2 will be $$\frac{\text{Number of turns in winding 46}}{\text{Number of turns in winding 41}}(1-K)E \quad (10)$$

Thus, if K approaches too closely to a value of one, proper synchronism could be lost in a circuit designed according to the FIGURE 1 embodiment of the invention.

At the other limit, as K approaches zero, the phase displacement becomes very critically dependent on the linkage ratio $\rho$, and when $K=0$ the inverters operate independently.

It was discovered that when using a specific circuit of the kind shown in FIGURE 1, self-locking could be obtained with values of K as high as 0.75 and synchronism was maintained with values of K as low as about 0.1. While values of K approaching 0.75 in the circuit of FIGURE 1 may be advantageous in wave shaping and timing circuits where the load is small, for cases where the load is larger, such as in power supplies, preferred values for the tap ratio K might be from 0.2 to 0.3.

There is a factor not previously discussed which in practice will effect the value that K can have. This factor is the load imposed on the inverters and the waveform of the voltage driving the slave inverter. The winding voltages in a slave inverter in a self-locking system are not rectangular, but the collector-to-collector voltage is, provided that taps 30, 31 are equidistant from centertap 22. Thus, if the outputs to be taken from the master and slave inverters are to be rectangular, they can be taken directly from collector to collector. That is, the master output can be connected to collectors 12 and 13 (or terminals 18 and 21), and the slave output can be connected to collectors 34 and 35. The master and slave loads must, in this case, be electrically separate. In the case of the master inverter a rectangular output could be obtained from an additional output winding on core 20 and if this were done the load need not be electrically separate from the collector-to-collector slave load. The output voltage for collector-to-collector loading is limited to an amplitude equal to twice the supply voltage (2E). The main windings 41 and 42 could be extended to provide an autotransformer output which would increase the output amplitude but this would no longer give a rectangular output waveform.

A feature of collector-to-collector loading is that the slave load does not load the master transistors. Referring to FIGURE 5, a resistive load 60 is shown connected to the slave inverter from collector to collector. Transistors $T_1$ and $T_3$ are the transistors conducting at the time depicted in FIGURE 5 and only the pertinent portions of the schematic are shown. When the magnetomotive forces or mmf.'s in the transformer cores are considered it will be seen that the load current $i_L$ appears in each section 41 and 42 of the main slave winding. The load component of collector current is therefore $2i_L$. Each portion of the main winding 19 between the taps 30 and 31 and the centertap 22 will carry the current $i_L$ provided the taps 30, 31 are equidistant from centertap $22_A$. Therefore, no component of load current $i_L$ is in transistor $T_1$. A similar analysis taken at different times during the cycle will show this to be true throughout the cycle.

If the outputs from the master and slave inverters are not taken collector-to-collector, but are taken from separate load windings on cores 20 and 40, the conducting transistors in the master will carry a component of the current caused by the slave's load. This will have an effect on the ability of the master and slave to self-lock. Nevertheless, self-locking inverters can carry a load in this manner if designed to do so.

As previously discussed a factor which affects the maximum permissible values of K is the waveform of the driving voltage which is applied to the bases of the slave transistors. In the circuit of FIGURE 1, the driving voltage has a stepped waveform. An auxiliary transformer may be used to overcome this difficulty and provide a rectangular driving voltage for the slave transistors. The same transformer may also be used to increase the amplitude of the output voltage to a value above that available with a collector-to-collector output and still provide a rectangular output. The schematic diagram of FIGURE 6 shows such an arrangement.

In FIGURE 6 the master inverter is the same as that in FIGURE 1 except that saturable core 20 has an output winding 61 with output terminals 62 and 63. The slave inverter in FIGURE 6 uses two transistors $T_3$ and $T_4$ connected in the same general common emitter configuration as in FIGURE 1. In FIGURE 6, however, a saturable core 64 has on it only the two main winding sections 41 and 42. Auxiliary or feedback windings 65 and 66 which supply the base drive for transistors $T_3$ and $T_4$ are wound on a non-saturating core 67. A main winding 68 on core 67 is connected from collector electrode 34 to collector electrode 35. The core 68 also has an output winding 69 with output terminals 70 and 71.

The arrangement of FIGURE 6 provides a rectangular master output at 62, 63 and a rectangular slave output at 70, 71 displaced from the master output by an amount determined by Equation 9. With the circuit of FIGURE 6 values of tap ratio K up to and including unity may be conveniently used, and values of K greater than unity could be used in this circuit.

It should be noted here that the selection of a value for the linkage ratio $\rho$ is not difficult. The linkage ratio in practice is determined by the phase displacement required and the value of K that can be used. In other words, for given values of K, the linkage ratio $\rho$ may vary such that the quantity $$\frac{\rho-1}{K}$$

equals or lies between the values $-1$ and $+1$. If we are to exclude the special case where $\rho=1$ and where changing K has no effect on phase displacement, then the quantity $$\frac{\rho-1}{K}$$

considered as an absolute value, must be greater than zero and up to and including unity.

The arrangement shown in FIGURE 6 requires the use of an additional core 67. The use of this additional core can be avoided by using compound windings on the master and slave saturable cores. This is shown in FIGURE 7. The master inverter circuit of FIGURE 7 is the same as that shown in FIGURE 1 except that four windings that do not appear in FIGURE 1 have been added to the saturable core 20. The slave inverter of FIGURE 7 is similar in circuitry to that of FIGURE 1, but an output winding has been added to the saturable core 40, and the connection of the feedback windings is different from that of FIGURE 1.

In FIGURE 7, in the slave inverter portion, the two auxiliary or feedback windings are designated 72 and 73 to distinguish them from the feedback windings of FIGURE 1. The auxiliary windings 72 and 73 may be the same as those in FIGURE 1 but the manner of connecting them is different. The circuit of FIGURE 7 shows a series connection between emitter electrode 32 and base electrode 36 of transistor $T_3$ comprising resistance 47, winding 72 and winding 75. Similarly there is a series circuit comprising resistance 47, auxiliary winding 73, and winding 76 between emitter 33 and base 37 of transistor $T_4$. Output winding 77 on saturable core 40 is connected in series with a winding 78 on saturable core 20. The slave output is therefore the sum of the outputs of windings 77 and 78 and is obtainable at terminals 79 and 80. An output winding 81 on core 20 provides an output from the master inverter at terminals 82 and 83. The poling of the various windings used in the FIGURE 7 embodiment is indicated in the drawing. Correct poling is, of course, essential.

If we assign values for the numbers of turns in the various windings we can derive the relationships between the windings. Suppose as before, windings 19A, 19B, 41 and 42 have $N_1$, $N_2$, $N_3$ and $N_4$ turns, respectively. Suppose windings 25, 26, 72, 73, 81, 78, 76, 75 and 77 have $N_5$, $N_6$, $N_7$, $N_8$, $N_9$, $N_{10}$, $N_{11}$, $N_{12}$ and $N_{13}$ turns, respectively. If the windings in the master and slave are balanced or symmetrical as is usual.

$$N_1 = N_2 \quad (11)$$

$$N_3 = N_4 \quad (12)$$

$$N_5 = N_6 \quad (13)$$

$$N_7 = N_8 \quad (14)$$

Then for equal amplitudes of output voltages at 82, 83 and at 79, 80, the following relationships exist.

$$N_{13} = \frac{N_3 \times N_9}{N_1} \quad (15)$$

$$N_{10} = K \times N_9 \quad (16)$$

$$N_7 = \frac{N_3 \times N_5}{N_1} \quad (17)$$

$$N_{11} = N_{12} = K \times N_5 \quad (18)$$

The arrangement of FIGURE 7 will provide rectangular base drive for the slave transistor and also will provide a rectangular output at both master output terminals 82, 83 and slave output terminals 79, 80. As was the case in FIGURE 6, because the slave transistor driving voltage is rectangular, values of the tap ratio K as high as unity may be conveniently used and values of K greater than one can be used.

The preceding description has been limited to circuits using only one slave inverter. This was done for simplicity. It will be obvious, however, that two or more slave inverters can be driven from one master inverter. Each slave inverter may, of course, have a different phase displacement from the master inverter. This invention lends itself readily to polyphase power supplies. A three phase power supply with the phases at 0, 120 and 240 degrees is a common example of a polyphase supply. With self-locking inverters according to the present invention phase differences of from zero to 180 degrees can be obtained. Thus, by providing for a phase difference from the master inverter in a first slave of 60 degrees and in a second slave of 120 degrees, a three phase supply is available. The 60 degree output will become 240 degrees with a correct poling or use of output leads as is well known.

FIGURE 8 shows a three phase power supply according to one embodiment of this invention. The circuitry of the master inverter and each slave inverter is basically the same as that described in connection with FIGURE 1. The output circuits of FIGURE 8 were not previously shown and will be discussed briefly. The master inverter is shown as having a saturable core 100, the 120 degree slave is shown as having a saturable core 101, and the 240 degree slave a saturable core 102. The cores 100, 101 and 102 have output windings 103, 104 and 105 on them. Two transistors $T_5$ and $T_6$ are connected in common emitter configuration with their bases driven from winding 103. A unidirectional voltage supply such as battery 106 supplies the power for the transistors. Winding 107 on transformer 108 is connected collector-to-collector between transistors $T_5$ and $T_6$. An output winding 109 with terminals 110, 111 provides the master output.

In a similar manner, transistors $T_7$ and $T_8$ in the 120 degree slave inverter are driven from the output winding 104 on saturable core 101. The power for transistors $T_7$ and $T_8$ is also supplied by battery 106. A transformer 112 provides the 120 degree slave output to terminals 114, 115.

The 240 degree slave also has two transistors, $T_9$ and $T_{10}$, supplied by battery 106. An output is available at terminals 116, 117 of transformer 118 from the 240 degree slave. The cores of the transformers 108, 112 and 118 are non-saturating.

As before, the phase difference between master and each slave is in accordance with Equation 9. It will, of course, be understood that the arrangements of FIGURES 6 and 7 can also be readily employed in a polyphase power source.

If the number of turns in each portion of the main winding of the master inverter on saturable core 100 are $N_{20}$ and $N_{21}$, the number of turns in each section of the 120 degree slave on saturable core 101 are $N_{22}$ and $N_{23}$, and the number of turns in each section of the 240 degree slave are $N_{24}$ and $N_{25}$, and if the main windings are balanced for each inverter, that is $N_{20} = N_{21}$, $N_{22} = N_{23}$ and $N_{24} = N_{25}$, and where $\phi 100$, $\phi 101$, and $\phi 102$ are the saturation fluxes of cores 100, 101 and 102, then the following relationship exists for the case of a phase displacement of 120 degrees.

$$N_{22} = N_{20} \frac{\phi 100}{\phi 101} \left(1 + \frac{K}{3}\right) \quad (19)$$

$$N_{24} = N_{20} \frac{\phi 100}{\phi 102} \left(1 - \frac{K}{3}\right) \quad (20)$$

In Equation 19 and 20 K is the tap ratio of Equation 2.

In FIGURE 8 a resistance 120 is shown connected to the negative terminal of the unidirectional supply 24 and the feedback windings. The resistance 120 ensures positive self-starting of the transistor-magnetic inverter and it may, of course, be used in the circuits of FIGURES 1, 6 or 7. The use of such a resistance is known in the art.

In any of the designs of phase-locked transistor-magnetic inverters it may be desirable to include means for suppressing the voltage spikes coincident with the steep portions of the winding voltage waveforms. Large spikes may cause transistor failure, and in a polyphase system they may cause premature switching. Suppression elements to suppress these spikes are not always necessary and have not been shown in FIGURES 1, 6, 7 or 8. However, the use of suppression elements is known and they can be employed where necessary.

The discussion of the invention has been limited up to this point to symmetrical transistor-magnetic inverters. However, asymmetric designs of inverters are possible. For example, with reference to FIGURE 1, taps 30 and 31 need not be equidistant from the centertap 22, $N_1$ need not equal $N_2$, and $N_3$ need not equal $N_4$. Other types of asymmetry might also be used. The same self-locking phenomena occur with asymmetrical inverters as with symmetrical inverters, and successful operation of asymmetric self-locking inverters has been achieved according to this invention.

As one example of asymmetry in a magnetic inverter, the case where the taps 30 and 31 (FIGURE 1) are not equidistant from centertap 22 can be considered. If these taps are not equidistant from the centertap there will be two tap ratios $K_1$ and $K_2$. The period of the master inverter would be T and the half-cycle of the master would be $$\frac{T}{2}$$

as before (see FIGURE 2). However, the positive and negative portions of the steady state waveform of the slave inverter need not be equal in time or amplitude. If the time of the positive portion of the slave inverter is $x$ and the time of the negative portion $y$, then $$T = x + y \quad (21)$$

The duration of the steady state slave waveform in the positive cycle that reaches an amplitude of $(1+K_1)E$ can be $zx$ and the duration at amplitude $(1-K_1)E$ can be $(1-z)x$. Similarly for the negative portion of the steady state slave waveform, the duration at level $-(1+K_2)E$ can be $wy$ and the duration at level $-(1-K_2)E$ can be $(1-w)y$.

As before $$\lambda_{20} = \frac{ET}{2} \quad (5)$$

and $$\rho = \frac{\lambda_{40}}{\lambda_{20}} \quad (7)$$

We get $$\frac{\rho TE}{2} = \lambda_{40} \quad (22)$$

Using Equation 22 and the previous amplitude-duration values the following equations may be derived for the volt-time area absorbed by the slave core 40

$$\frac{\rho T}{2} = (1-z)x(1-K_1) + zx(1+K_1) \quad (23)$$

$$\frac{\rho T}{2} = (1-w)y(1-K_2) + wy(1+K_2) \quad (24)$$

$$wy = \frac{T}{2} - (1-z)x \quad (25)$$

Equations 21, 23, 24 and 25 can be solved for $w$, $x$, $y$ and $z$ in terms of the linkage ratio $\rho$, tap ratios $K_1$ and $K_2$, and the period T of the master inverter.

$$z = \frac{1}{2}\left[1 + \frac{2(\rho-1)}{2K_1 - \rho(K_1-K_2)}\right] \quad (26)$$

$$w = \frac{1}{2}\left[1 + \frac{2(\rho-1)}{2K_2 + \rho(K_1-K_2)}\right] \quad (27)$$

$$x = \frac{T}{2}\left[1 - \frac{(K_1-K_2)(\rho-1)}{K_1+K_2}\right] \quad (28)$$

$$y = \frac{T}{2}\left[1 + \frac{(K_1-K_2)(\rho-1)}{K_1+K_2}\right] \quad (29)$$

It will be noted that if $K_1 = K_2 = K$ then Equations 26 and 27 reduce to Equation 8 and $$x = y = \frac{T}{2}$$

It is also interesting to note from the above equations that if $\rho = 1$ as was the case in a prior art inverter previously discussed, then $z = w = \frac{1}{2}$. That is, only a phase displacement of 90 degrees between master and slave is possible.

If specific values of $K_1 = 0.3$, $K_2 = 0.2$, and $\rho = 1.1$ are given to the preceding equations, then the positive and negative portions of the slave period would have durations of $$0.98\frac{T}{2}$$

and $$1.02\frac{T}{2}$$

respectively. The deviation from $$\frac{T}{2}$$

is very small. The phase displacement is no longer uniquely defined unless it is considered to be the phase displacement between the fundamental of the slave waveform and that of the master waveform. The values of $z$ and $w$ would be 0.704 and 0.696 respectively. If the inverter arrangement had been symmetrical first with $K = 0.3$ and then with $K = 0.2$ the phase displacement would have been 120 degrees and 135 degrees respectively. or in terms of the numeric $\alpha$ the displacement would have been 0.666 and 0.750 respectively. Thus, in the asymmetric example, the use of different tap ratios to feed a single slave produce a phase displacement roughly in between the displacement that would be obtained using each of the tap ratios separately in symmetrical circuits. Satisfactory self-locking of an asymmetrical inverter has been obtained with one of the tap ratios equal to zero.

When the previous type of asymmetry is used, the collector-to-collector waveform is not rectangular but is rather a stepped waveform.

It will be seen that self-locking magnetic inverter arrangements can be designed according to the present invention to provide a polyphase output with any desired phase displacement between the phases.

We claim:

1. A generator adapted to provide an alternating output of at least two phases from a unidirectional power source comprising a first magnetic inverter including a first switching means, a first saturable core having a tapped main winding with at least one tap thereon whereby the number of turns in the tapped section over the number of turns in the winding is defined as tap ratio K, means including said first core to cause said switching means to alternate between two conductive states and thereby oscillate at a predetermined frequency, and means to provide a first output alternating at said frequency, at least a second magnetic inverter including a second switching means, a second saturable core having a main winding thereon, means including said second core to cause said second switching means to alternate between two conductive states, coupling means to apply a voltage derived from said tap on the main winding of said first core to said second inverter to cause said second inverter to synchronize with said first inverter, means to provide a second output from said second inverter alternating at a fundamental frequency equal to said predetermined frequency and displaced in phase from said first output by $\theta$ electrical degrees as determined approximately by the equation, $$\theta = 90°\left(1 + \frac{\rho-1}{K}\right)$$

where $\rho$ is the number of turns in the main winding on said second core times the saturation flux of said second core over the number of turns in the main winding of said first core times the saturation flux of said first core, the value of K being such that said second inverter will phase-lock to said first inverter, $\rho$ is greater than zero, and the absolute value of $$\frac{\rho-1}{K}$$

is greater than zero and up to and including unity.

2. The generator according to claim 1 where the switching means is a semiconductive switching device.

3. The generator according to claim 1 where the said first winding has two tapped sections each of a different number of turns giving two tap ratios $K_1$ and $K_2$ which have an average value approximately equal to K.

4. A generator adapted to provide an alternating output of at least two phases from a unidirectional power source comprising a first magnetic inverter including a first pair of switching devices, a first saturable core having a first main winding thereon, a first tap on said first main winding dividing it into first and second portions, circuit means connecting one of said first pair of switching devices with each portion of said first main winding, second and third taps on said first main winding, said second tap being in said first portion and said third tap being in said second portion of said first main winding, the number of turns between said second and first taps over the number of turns in said first portion defining a tap ratio $K_1$ and the number of turns between said third and first taps over the number of turns in said second portion defining tap ratio $K_2$, means including said first core to cause said first pair of switching devices to alternate between two conductive states and thereby oscillate at a predetermined frequency, and means to provide a first output alternating at said frequency, at least a second inverter including a second pair of switching devices, a second saturable core having a main winding thereon, means including said second core to cause said second pair of switching devices to alternate between two conductive states, coupling means to apply voltages derived from said second and third taps to the main winding on said second core adapted to cause said second inverter to synchronize with said first inverter, means to provide a second output from said second inverter alternating at a fundamental frequency equal to said predetermined frequency, the fundamental frequency of said second output being displaced in phase from said first output by an amount falling between the displacements $\theta_1$ and $\theta_2$ determined by equations, $$\theta_1 = 90° \left(1 + \frac{\rho - 1}{K_1}\right)$$

$$\theta_2 = 90° \left(1 + \frac{\rho - 1}{K_2}\right)$$

where $\rho$ is the number of turns in the main winding of said second core times the saturation flux of said second core over the number of turns in the main winding of said first core times the saturation flux of said first core, the values of $K_1$ and $K_2$ being such that said second inverter will phase lock to said first inverter, $\rho$ being greater than zero, and the absolute value of $$\frac{\rho - 1}{K_1}$$

and $$\frac{\rho - 1}{K_2}$$

being greater than zero and up to and including unity.

5. The generator according to claim 4 where $K_1 = K_2$.

6. The generator according to claim 4 where said first and second pairs of switching devices are semiconductive devices.

7. A generator adapted to provide an alternating output of at least two phases from a unidirectional power source comprising, a first transistor-magnetic inverter including a first saturable core having a tapped main winding thereon such that the ratio of the number of turns in the tapped section over the number of turns in the winding is defined as tap ratio K, feedback means in said first inverter to cause oscillation at a predetermined frequency, and output means for said first inverter to provide a first alternating output at said predetermined frequency, and at least a second transistor-magnetic inverter including a second saturable core having a main winding thereon, coupling means to apply a voltage derived from the tap on the main winding of said first inverter to said second inverter to synchronize said second inverter to said first inverter, output means on said second inverter to provide a second alternating output, said second output being displaced in phase from said first output by an amount determined by the equation, $$\theta = 90° \left(1 + \frac{\rho - 1}{K}\right)$$

where $\rho$ is the number of turns in the main winding on said second core times the saturation flux of said second core over the number of turns in the main winding of said first core times the saturation flux of said first core, the value of K being greater than zero and such that said second inverter will phase lock to said first inverter, the value of $\rho$ being greater than zero, and the absolute value of $$\frac{\rho - 1}{K}$$

being greater than zero and up to and including unity.

8. A generator adapted to provide an alternating output of at least two phases from a unidirectional power source comprising a first transistor-magnetic inverter including a first saturable core with a saturation flux of $\phi_1$, a centertapped main winding on said first core with $N_A$ turns on each side of the centertap, taps on said main winding equidistant from said centertap with $N_B$ turns between each tap and the centertap, the ratio $$\frac{N_B}{N_A}$$

being defined as a tap ratio K, feedback means to cause said first inverter to oscillate at a predetermined frequency, and output means on said first inverter to provide a first alternating output at said predetermined frequency, and at least a second transistor-magnetic inverter including a second saturable core with a saturation flux $\phi_2$, a main winding on said second core having two equal sections of $N_C$ turns each, coupling means to apply voltages derived from said taps on the main winding of said first core to the main winding on said second core to synchronize said second inverter to said first inverter output means on said second inverter to provide a second alternating output, said second output being displaced in phase from said first output by a number of electrical degrees $\theta$ determined by the equation $$\theta = 90° \left(1 + \frac{\rho - 1}{K}\right)$$

where $$\rho = \frac{N_C \phi_2}{N_A \phi_1}$$

the value of K being greater than zero and such that said second inverter will phase lock to said first inverter, the value of $\rho$ being greater than zero and the absolute value of $$\frac{\rho - 1}{K}$$

being greater than zero and up to and including unity.

9. A generator adapted to provide an alternating output of at least two phases from a unidirectional power source comprising a first magnetic inverter including a first pair of switching devices, a first saturable core having a centertapped main winding thereon with $N_A$ turns each side of the centertap, first and second taps on each side of the centertap whereby there are $N_B$ turns between each first and second tap and the said centertap, the ratio $$\frac{N_B}{N_A}$$

being defined as tap ratio K, a unidirectional power source to supply operating power to said first inverter, feedback windings on said first core, means including said feedback windings to cause said first pair of switching devices to alternate between two conductive states and thereby generate an oscillation at a predetermined frequency, and means to derive a first output from said generated oscillation, at least a second magnetic inverter including a second pair of switching devices, a second saturable core having a main winding with two separate sections thereon, circuit means connecting one of said second pair of switching devices to each of said separate sections of said main winding on said second core, a transformer with a non-saturating core, a first winding on said transformer core connected across the main winding of said second saturable core, a pair of feedback windings on said transformer core, means connecting said second inverter to said power source to provide operating power for said second inverter, means including said feedback windings adapted to cause said second pair of switching devices to alternate between two conductive states, coupling means to apply voltages derived from said first and second taps to the main winding of said second saturable core to cause said second inverter to synchronize with said first inverter, and an output winding on said transformer core to provide a second output alternating at said predetermined frequency and displaced in phase from said first output by a number of electrical degrees determined by the equation $$\theta = 90° \left(1 + \frac{\rho - 1}{K}\right)$$

where $\rho$ is the number of turns in the main winding of said second saturable core times the saturation flux of said second saturable core over the number of turns in the main winding of said first saturable core times the saturation flux of said first saturable core, K has a value greater than zero such that said second inverter will phase-lock to said first inverter, $\rho$ is greater than zero, and the absolute value of $$\frac{\rho - 1}{K}$$

has a value greater than zero and up to and including unity.

10. In combination, a first magnetic inverter including a first pair of semiconductive switching devices, a first saturable core having a tapped main winding, circuit means connecting one of said first pair of semiconductive devices to each side of said tapped main winding, a unidirectional power source to provide operating power to said first inverter, first feedback windings on said first core, means including said first feedback windings to cause said first pair of semiconductive devices to alternate between two conductive states at a predetermined frequency, and an output winding on said first core to provide a first alternating output at said frequency, at least a second magnetic inverter having a second pair of semiconductive switching devices, a second saturable core having a main winding with two sections, circuit means connecting one of said second pair of semiconductive devices to each section of the main winding on said second saturable core, a transformer with a non-saturating core, a first winding on said transformer core connected across said main winding of said second saturable core, second feedback windings on said transformer core, means connecting said second inverter to said power source to provide operating power to said second inverter, means including said second feedback windings adapted to cause said second pair of switching devices to alternate between two conductive states, coupling means to synchronize said second inverter to said first inverter, and an output winding on said transformer to provide a second output displaced in phase from said first output.

11. A generator adapted to provide an alternating output of at least two phases from a unidirectional power source comprising a first magnetic inverter including a first saturable core having a tapped main winding thereon such that the ratio of the number of turns in the tapped section over the number of turns in the winding is defined as tap ratio K, feedback means in said first inverter, means including said feedback means to cause oscillation at a predetermined frequency, output means for said first inverter to provide a first alternating output at said predetermined frequency, and an additional winding on said first core, at least a second magnetic inverter, said second inverter including a second saturable core having a main winding thereon, coupling means to apply a voltage derived from the tap on the main winding of said first saturable core to said main winding on said second core to cause said second inverter to synchronize with said first inverter, an additional winding on said second core, means to connect said additional windings on said first and second cores in series to provide a second alternating output at said predetermined frequency, said additional windings being proportioned to make said second output approximately equal in amplitude to said first output, said second output being displaced in phase from said first output by a number of electrical degrees $\theta$ determined by the equation $$\theta = 90° \left(1 + \frac{\rho - 1}{K}\right)$$

where $\rho$ is the linkage ratio defined as the number of turns in the main winding on said second core times the saturation flux of said said second core over the number of turns in the main winding of said first core over the saturation flux of said first core, the value of K being greater than zero and such that said second inverter will phase-lock to said first inverter, the value of $\rho$ being greater than zero, and the absolute value of $$\frac{\rho - 1}{K}$$

being greater than zero and up to and including unity.

12. In combination, a first inverter having a first saturable core with a saturation flux $\phi_1$, a centertapped main winding on said first core with $N_A$ turns on each side of the centertap, first and second taps on said main winding equidistant from said centertap with $N_B$ turns between each tap and said centertap, the ratio $$\frac{N_B}{N_A}$$

being defined as tap ratio K, a first and a second transistor each having emitter, collector, and base electrodes, the collector electrode of said first transistor being connected to one end of said main winding and the collector electrode of said second transistor being connected to the other end of said main winding, a unidirectional power source having positive and negative terminals, said positive terminal being connected to each of said emitters and said negative terminal being connected to said centertap, first and second feedback windings each having $N_D$ turns on said first core, one end of said first feedback winding being connected to the base electrode of said first transistor and one end of said second feedback winding being connected to the base electrode of said second transistor, the other ends of said first and second feedback windings being connected through a first common impedance to said positive terminal, a first output winding on said first core having $N_E$ turns to provide a first alternating output, first, second and third additional windings on said first core having $N_F$, $N_G$, and $N_H$ turns respectively where $N_F = N_G = KN_D$ and $N_H = KN_E$, a second inverter having a second saturable core with the same saturation flux $\phi_1$, a main winding on said second core having two equal, separate sections of $N_C$ turns each, one end of one main winding section of said second core being connected to the first tap on said main winding of said first core and one end of the other main winding section of said second core being connected to said second tap, third and fourth transistors each having emitter, collector and base electrodes, the collector electrode of said third transistor being connected to the other end of said one main winding section of said second core and the collector electrode of said fourth transistor being connected to the other end of said other main winding section, first and second auxiliary windings each of $N_J$ turns on said second core where $$N_J = \frac{N_C \times N_D}{N_A}$$

said first auxiliary winding, said first additional winding, and a second impedance being connected in series between the base electrode of said third transistor and said positive terminal of said source, said second auxiliary winding, said second additional winding and said second impedance being connected in series between the base electrode of said fourth transistor and said positive terminal of said power source, said emitter electrodes of said third and fourth transistors, being connected directly to the positive terminal of said source, a second output winding on said second core having $N_K$ turns where $$N_K = \frac{N_C \times N_E}{N_A}$$

said second output winding being connected in series with said third additional winding on said first core to provide a second alternating output, said second output being displaced in phase from said first output by a number of electrical degrees $\theta$ determined by the equation $$\theta = 90° \left(1 + \frac{\rho - 1}{K}\right)$$

where $$\rho = \frac{N_C}{N_A}$$

K is greater than zero and such that said second inverter will phase lock to said first inverter, the value of $\rho$ is greater than zero, and the absolute value of $$\frac{\rho - 1}{K}$$

is greater than zero and up to and including unity.

13. A generator adapted to provide an alternating output of three phases from a unidirectional power source comprising a first magnetic inverter including a first pair of switching devices, a first saturable core with a saturation flux $\phi_1$, a centertapped main winding on said first core with $N_A$ turns on each side of the centertap, first and second taps on said main winding equidistant from said centertap with $N_B$ turns between each tap and said centertap, the ratio $$\frac{N_B}{N_A}$$

being defined as a tap ratio K, circuit means connecting one of said first pair of switching devices to each side of said main winding, a pair of feedback windings on said first core, means including said feedback windings adapted to cause said first pair of switching devices to alternate between two conductive states and thereby oscillate at a predetermined frequency, a unidirectional power source to provide operating power to said first inverter, an output winding on said first core, and a first amplifier connected to said output winding adapted to provide a first amplified output alternating at said predetermined frequency, a second magnetic inverter including a second pair of switching devices, a second saturable core with a saturation flux $\phi_2$, a main winding on said second core having a first and a second separate section with $N_C$ turns in each section, one of said second pair of switching devices being connected to said first section and the other to said second section of the main winding on said second core, means including said second core to cause said second pair of switching devices to alternate between two conductive states, coupling means to apply voltages derived from said first and second taps to the first and second sections of the main winding on said second core adapted to cause said second inverter to synchronize to said first inverter, an output winding on said second core, and a second amplifier connected to said output winding adapted to provide an amplified output alternating at said predetermined frequency and displaced in phase from said first output by $\phi_1$ degrees according to the equation $$\theta_1 = 90° \left(1 + \frac{\rho_1 - 1}{K}\right)$$

where $$\rho_1 = \frac{N_C \phi_2}{N_A \phi_1}$$

and is greater than zero and the absolute value of $$\frac{\rho_1 - 1}{K}$$

being greater than zero and up to and including unity, and a third magnetic inverter including a third pair of switching devices, a third saturable core with a saturation flux of $\phi_3$, a main winding on said third core having a first and a second section with $N_P$ turns in each section, one of said third pair of switching devices being connected to said first section and the other to said second section of the main winding on said third core, means including said third core to cause said third pair of switching devices to alternate between two conductive states, coupling means to apply voltages derived from said first and second taps to the first and second sections of the main winding on said third core adapted to cause said third inverter to synchronize to said first inverter, an output winding on said third core, and a third amplifier connected to the output winding on said third core to provide an amplified output alternating at said predetermined frequency and displaced in phase from said first output by $\theta_2$ degrees according to the equation $$\theta_2 = 90° \left(1 + \frac{\rho_2 - 1}{K}\right)$$

where $$\rho_2 = \frac{N_D \phi_3}{N_A \phi_1}$$

and is greater than zero, the absolute value of $$\frac{\rho_2 - 1}{K}$$

being greater than zero and up to and including unity, and the value of K being greater than zero such that said second and third inverters will phase-lock to said first inverter.

No references cited.